United States Patent [19]

Nagashima et al.

[11] Patent Number: 4,517,590
[45] Date of Patent: May 14, 1985

[54] COLOR PRINTING APPARATUS

[75] Inventors: Masayoshi Nagashima, Chigasaki; Hiroshi Yamane, Ebina, both of Japan

[73] Assignee: Tokyo Shibaura Denki Kabushiki Kaisha, Kawasaki, Japan

[21] Appl. No.: 437,194

[22] Filed: Oct. 28, 1982

[30] Foreign Application Priority Data

| Oct. 31, 1981 | [JP] | Japan | 56-175449 |
| Oct. 31, 1981 | [JP] | Japan | 56-175450 |
| Oct. 31, 1981 | [JP] | Japan | 56-175451 |
| Feb. 18, 1982 | [JP] | Japan | 57-23638 |
| Feb. 18, 1982 | [JP] | Japan | 57-25022 |
| Feb. 18, 1982 | [JP] | Japan | 57-25023 |

[51] Int. Cl.³ .................................... H04N 1/46
[52] U.S. Cl. ................... 358/75; 346/76 PH
[58] Field of Search .............. 358/75, 78; 346/76 PH

[56] References Cited

U.S. PATENT DOCUMENTS

| 4,067,017 | 1/1978 | Dertouzos | 346/76 PH |
| 4,206,475 | 6/1980 | Taudt | 358/75 |
| 4,323,919 | 4/1982 | Fujii | 358/75 |
| 4,346,401 | 8/1982 | Ohara | 358/75 |
| 4,378,566 | 3/1983 | Tsukamura | 346/76 PH |
| 4,427,985 | 1/1984 | Kikuchi | 346/76 PH |

FOREIGN PATENT DOCUMENTS

| 0050481 | 4/1982 | European Pat. Off. . |
| 2440764 | 6/1978 | Fed. Rep. of Germany . |
| 1183966 | 3/1970 | United Kingdom . |
| 1292485 | 10/1972 | United Kingdom . |
| 1317192 | 5/1973 | United Kingdom . |
| 1433025 | 4/1976 | United Kingdom . |
| 2070383 | 9/1981 | United Kingdom . |
| 2110036 | 6/1983 | United Kingdom . |

Primary Examiner—Michael A. Masinick
Attorney, Agent, or Firm—Cushman, Darby and Cushman

[57] ABSTRACT

A color printing apparatus includes a scanner for scanning a color document and for converting the reflecting light from the color document into color image signals of black, red, green and blue, and a thermal head unit driven by signals corresponding to complementary colors of the colors of the color signals from the scanner. The thermal head unit, making an ink ribbon to contact the paper intimately, transfers the inks of the ink layers of black, magenta, yellow and cyan on the ink ribbon according to the complementary color signals.

12 Claims, 26 Drawing Figures

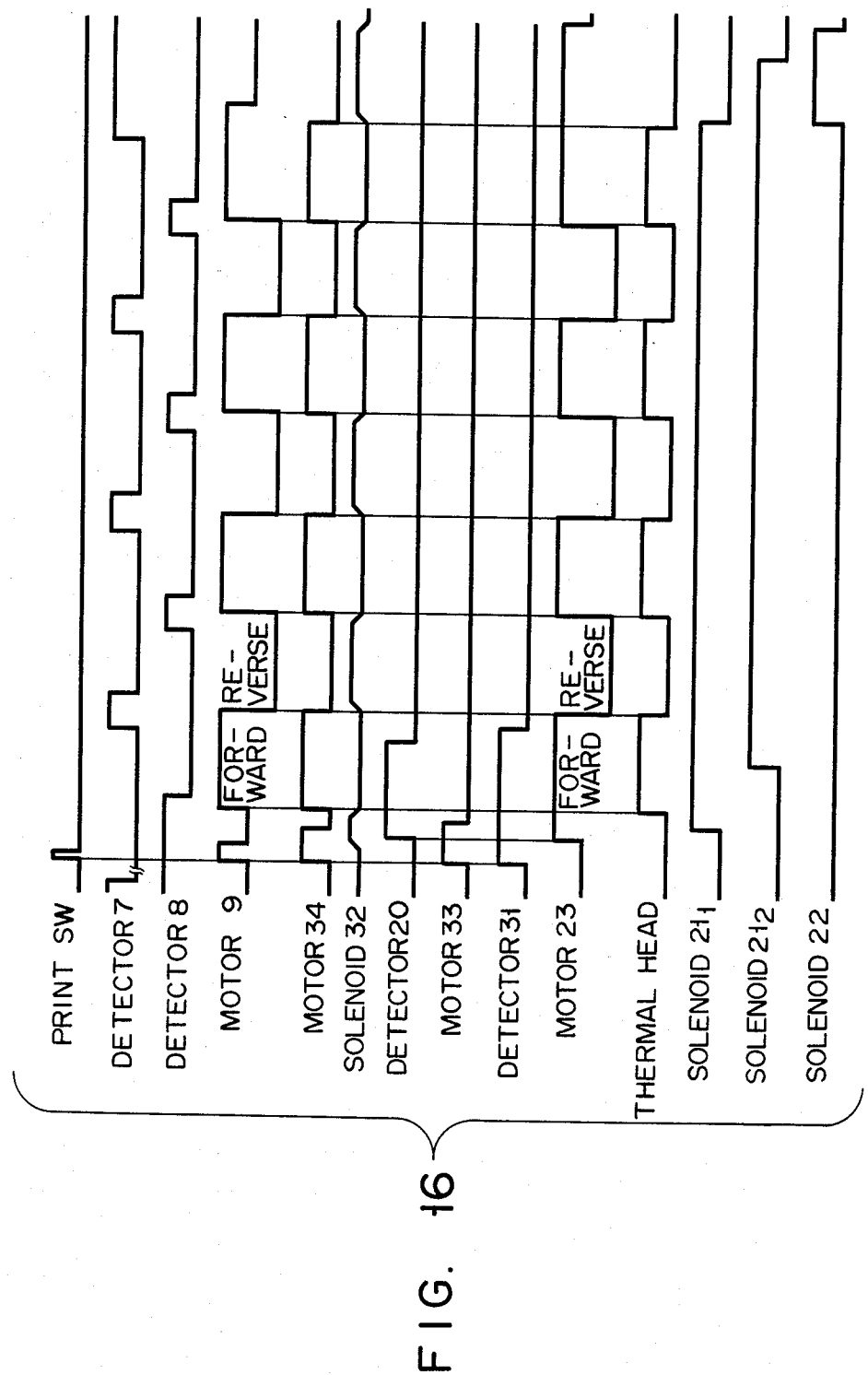
F I G. 16

COLOR PRINTING APPARATUS

BACKGROUND OF THE INVENTION

The present invention relates to a color printing apparatus and, more particularly, to a color printing apparatus using a thermal head.

There has been known an electrographic color copying apparatus as a color printing apparatus. The color copying apparatus is large in size and expensive to manufacture and to operate, and further, it requires complicated maintenance. Recently, the thermal printing apparatus has attracted much attention because it is low in cost and maintenance-free. Thermal printing apparatuses using thermal heads have been developed and some of them have been put into practical use. The thermal printing apparatus, however, still has technical problems in regard to operating in a color printing mode. So far as we know, there have never been developed thermal color printing apparatuses which are truly practical.

SUMMARY OF THE INVENTION

Accordingly, an object of the present invention is to provide a thermal color printing apparatus which has low cost, high reliability, and is maintenance-free.

According to the present invention, there is provided a thermal color printing apparatus comprising a color scanner for converting a color pattern on a color document into a plurality of image signals corresponding to different fundamental colors, an ink transfer medium with a plurality of color inks corresponding to the complementary colors of the different fundamental colors arranged on a plane in successive order, and a thermal head for thermally transferring the color inks of the ink transfer medium to a paper sheet according to the image signals.

According to one aspect of the present invention, there is provided a thermal color printing apparatus in which a calorific value of the thermal head is adjusted according to levels of the image signals corresponding to different colors, thereby to compensate for a level change in the image signals due to the color difference.

According to another aspect of the present invention, there is provided a thermal color printing apparatus using an ink transfer medium with color ink layers of which an amount and/or viscosity are selected according to a level change in the image signals due to the color difference.

According to yet another aspect of the present invention, there is provided a thermal color printing apparatus provided with a color selector for selecting any one of the colors corresponding to the image signals.

According to still another aspect of the present invention, there is provided a thermal color printing apparatus which is operable in a color printing mode or a monochrome printing mode.

According to a further aspect of the present invention, there is provided a thermal color printing apparatus in which a thermal head and a feed roller, together with a color ink transfer medium, are separated from a transfer drum every time the color of the color ink transfer medium is changed, thereby to simplify the transfer of a copy sheet and to prevent the color registration from being impaired.

BRIEF DESCRIPTION OF THE DRAWINGS

FIG. 16 shows a timing chart illustrating the operation of an embodiment of a thermal color printing apparatus in which a take-up drum is rotated in a forward or reverse direction;

DETAILED DESCRIPTION OF THE PREFERRED EMBODIMENTS

Figure 1:
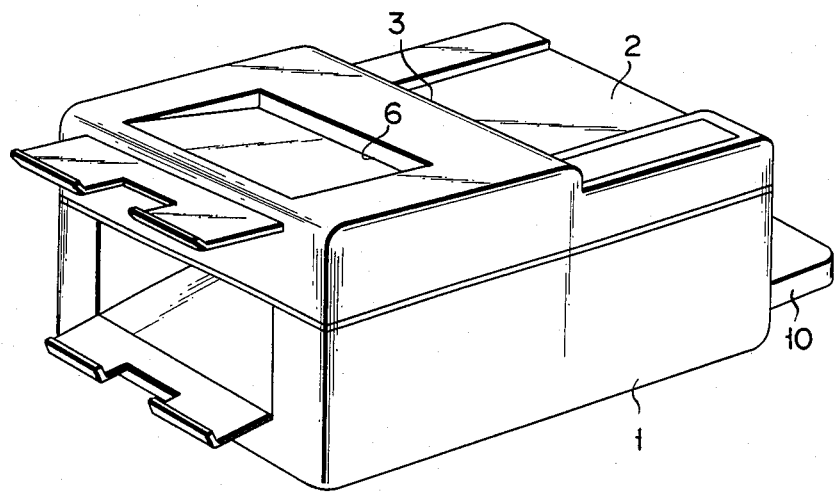
FIG. 1 shows a perspective view of an embodiment of a thermal color printing apparatus according to the present invention.
Figure 2:
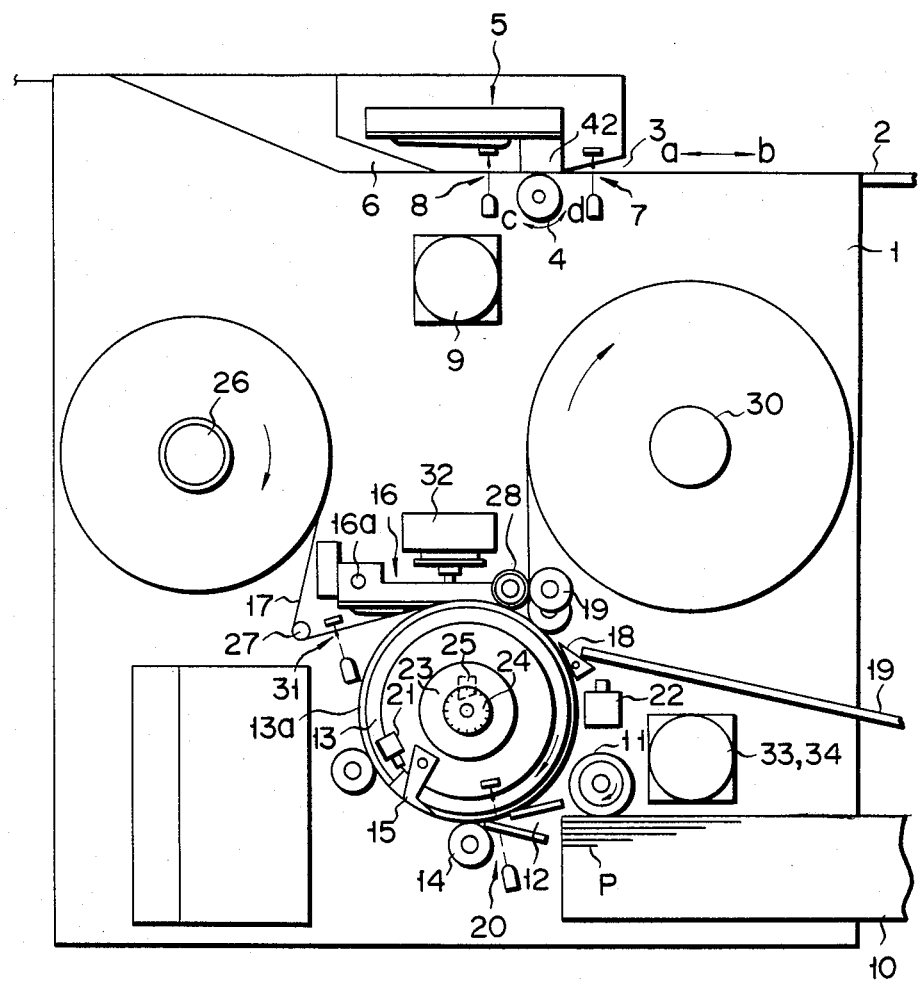
FIG. 2 is a side view of the thermal color printing apparatus of FIG. 1 when a side cover of the apparatus is removed.

Referring to FIG. 1, there is shown a thermal color printing apparatus which is an embodiment of the present invention. In the figure, a body frame 1 of the color printing apparatus is provided with a table 2 on which a document to be printed is placed, and a port 3 through which the document is inserted. As shown in FIG. 2, a scanner 5 is provided adjacent to the document insertion port 3. The document inserted through the port 3 is pressed against a contact sensor head 42 contained in a contact scanner 5 by means of a roller 4. The document passed through the scanner 5 is discharged through a port 6. A detector 7 for detecting the front end of the document is provided in the document insertion port 3. Similarly, a detector 8 for detecting the rear end of the document is provided in the document discharge port 6. The roller 4 is forwardly or reversely rotated by a pulse motor 9.

Figure 3:
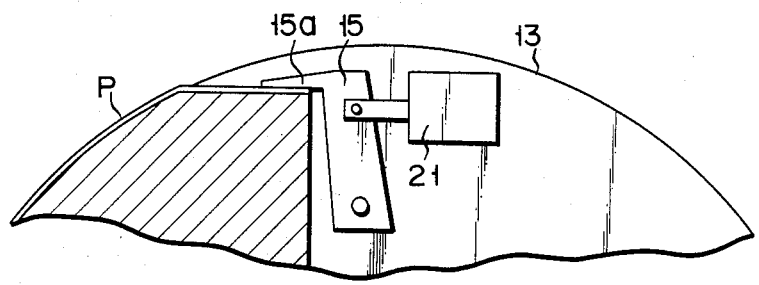
FIG. 3 is a side view of a gripper provided in a paper transfer drum of FIG. 1.

A cassette 10 containing a stack of papers P is injected into the right lower part of the main frame 1. A paper feed roller 11 feeds papers P sheet by sheet from the cassette 10 along a guide path 12 to a take-up drum 13 with a resilient layer 13a made of rubber, for example, and layered on the surface thereof. The paper sheet P is pressed against the drum 13 by means of a tension roller 14 and fed to a paper gripper 15. As well illustrated in FIG. 3, the paper gripper 15 is provided with a plurality of claws 15a driven by a solenoid 21, which cross the front end of the incoming paper. These claws hold the paper at a plurality of portions when driven by the solenoid 21. Incidentally, the circumference of the drum 13 is selected to be longer than the length of the paper P. A thermal head unit 16, disposed above the drum 13 and coupled with a solenoid 32, is pulled and separated from the drum 13 by means of the solenoid 32. A color transfer medium 17 such as an ink ribbon 17 wound around a reel 26 is unwound by a roller 27 led to between the drum 13 and the thermal head unit 16, and wound again around by a take-up reel 30 through the combination of a feed roller 28 and a take-up roller 29. A plurality of claws 18 for peeling the paper P passed through the thermal head unit 16 from the drum 13 are provided in proximity to the surface of the drum 13. Although not shown, the peeling claws 18, arranged traversing the front end of the paper P, are spaced correspondingly to the claws 15a, and driven by solenoids 22. The paper P peeled is then discharged to a tray 19.

A detector 20, provided on the guide path 12, photoelectrically detects the transferring paper P. The drum 13 is driven by a pulse motor coupled therewith. A timing disk 24 marked with a plurality of slits is mounted to a rotating shaft of the pulse motor 23. The timing detector 25 photoelectrically detects the timing slits of the timing disk 24.

The pulse motor 33 is provided for driving the paper feed roller 11, and the pulse motor 34 is for driving the feed roller 28 and the tension roller 29. The detector 31 photoelectrically detects a color of the ink ribbon 17.

Figure 4:
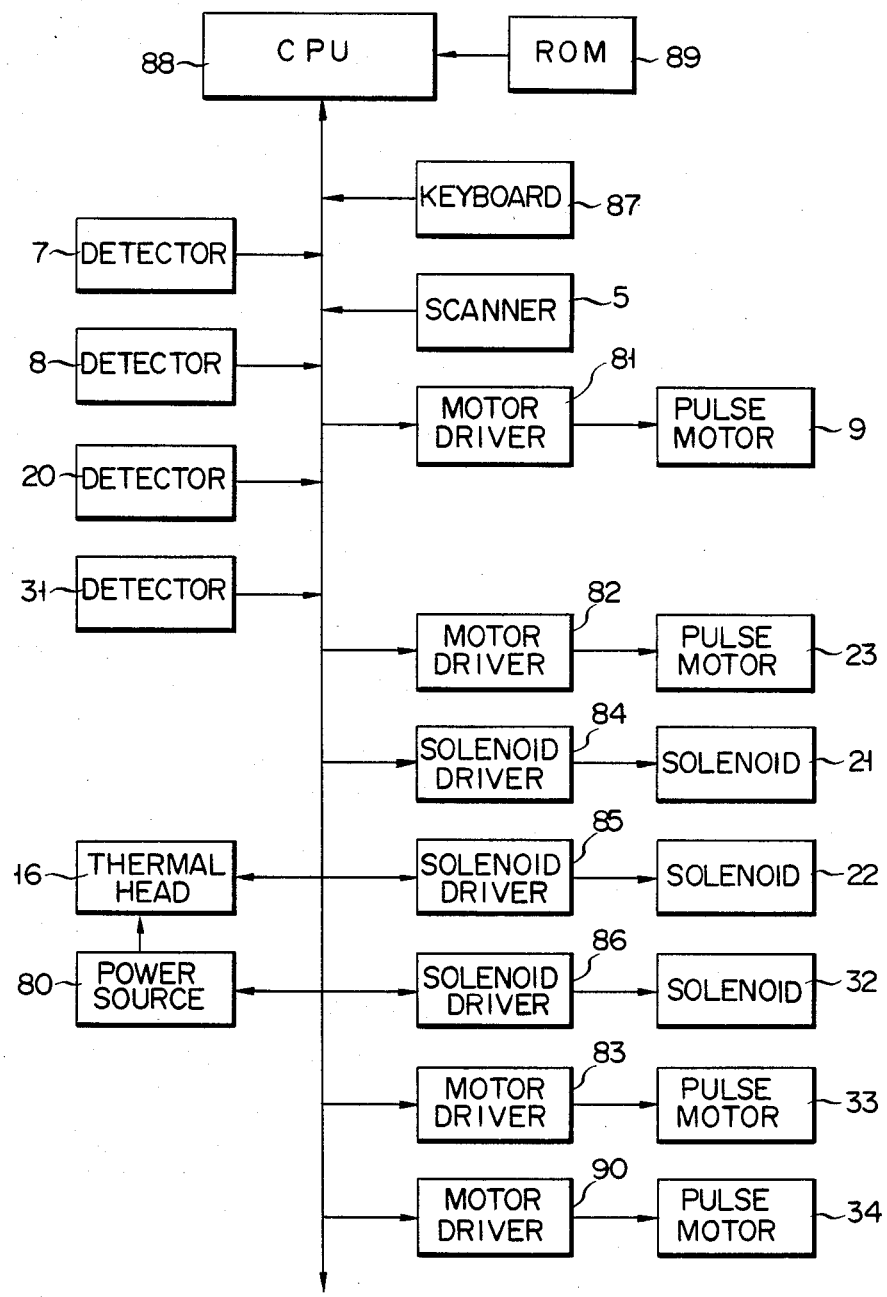
FIG. 4 is a block diagram of a control system in use for the thermal printing apparatus of FIG. 2.

Turning now to FIG. 4, there is shown a control system in use for the thermal color printing apparatus according to the present invention. As shown, the scanner 5, the thermal head unit 16, and the detectors 7, 8, 20 and 31 are coupled together with the CPU 88. The pulse motors 9, 23, 33 and 34 are respectively coupled through the motor drivers 81, 82, 83 and 90 to the CPU 88. The solenoids 21, 22 and 32 are coupled with the CPU 88, through the solenoid drivers 84, 85 and 86, respectively. An operating section, for example, a keyboard unit 87, is provided for starting the print operation or for setting an initial value. A ROM 89 stores a program for executing a sequence of printing operations. The CPU 88 controls the printing operation under control of the program.

Figure 5:
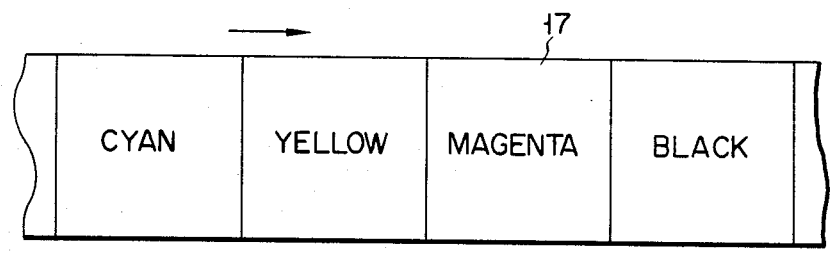
FIG. 5 is a plan view of an ink ribbon used in the printing apparatus of FIG. 2.

The ink ribbon 17 has a repeating pattern of different color ink layers formed on a substrate sheet, e.g., a condensor paper of several microns in thickness, as shown in FIG. 5. The colors contained in the ink layers are cyan, yellow, magenta, and black, and these colors are arranged on a ribbon base in this order in the moving direction of the ribbon. Each ink layer is made of the combination of wax and pigment or dye.

Figure 6:
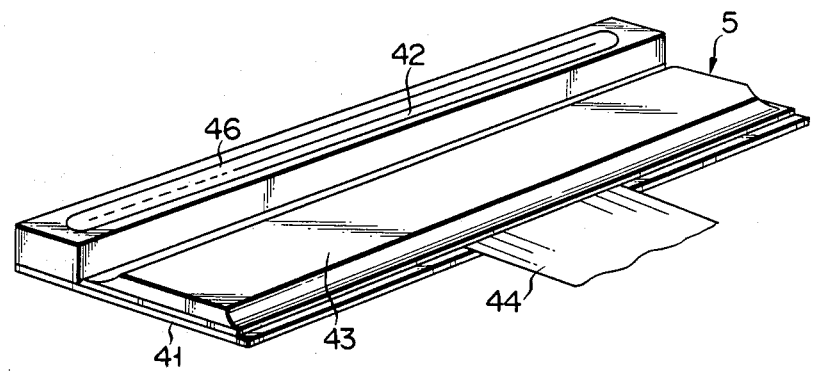
FIG. 6 is a perspective view of a scanner provided in the thermal color printing apparatus of FIG. 2.
Figure 7:
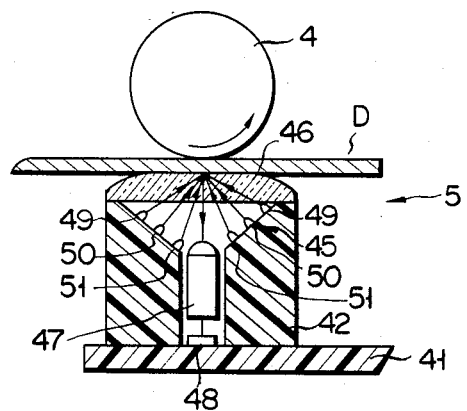
FIG. 7 is a cross sectional view of a scanner of FIG. 6.

As shown in FIG. 6, the scanner 5 is comprised of a line dot sensor 42 with several (e.g. 8) lines per mm and 1728 dots on a ceramic substrate 41, an arcuate protection glass 46 for protecting the line dot sensor 42, a driver controller 43, and a lead wire 44 connected to the driver controller 43. As shown in FIG. 7, the line dot sensor 42 includes LED arrays 49, 50 and 51 for emitting red, green and blue light, and a self-focussing (selfoc) lens or rod lens 47 for collecting reflecting light rays, an array of photosensing elements as denoted as 48 for sensing the light rays collected by the lens 47. The line dot sensor 42 confronts the document D through the arcuate protect glass 46. Each of the LED arrays 49, 50 and 51 includes light emitting diodes (LED) corresponding to the number of dots, i.e. 1728. The photosensor array likewise has 1728 photosensing elements. In the line dot sensor 42, when the LED arrays 49, 50 and 51 emit light, the document D is illuminated with the emitted light rays through the protection glass 46. The reflecting light rays from the document D are collected onto the photosensor array 48 by means of the rod lens 47. The photosensor array 48 generates electrical signals corresponding to the reflecting light rays.

Figure 8:
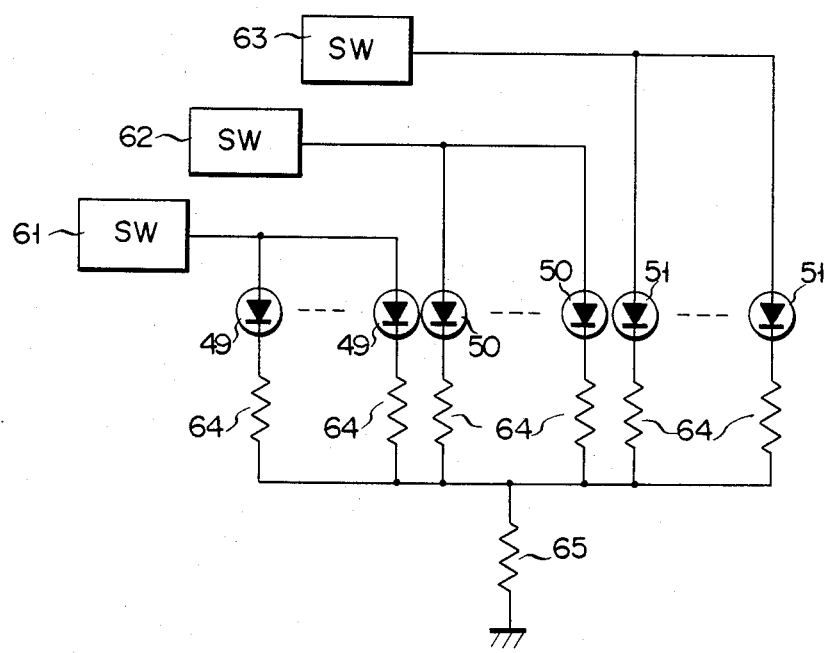
FIG. 8 is a circuit diagram of the scanner of FIG. 6.

In FIG. 8, there is shown an LED array drive circuit. As shown, the LED array 49 for red light emission is comprised of a switch 61, a group of LEDs 49, and a group of resistors 64 coupled with the LEDs group, and a resistor 65 grounded. The switch 61 is connected to the anodes of the LEDs 49. The resistors 64 connected to the cathodes of the diodes 49 are for adjusting an amount of light of each LED. This circuit arrangement is correspondingly applied for the remaining LED arrays 50 and 51.

Figure 9:
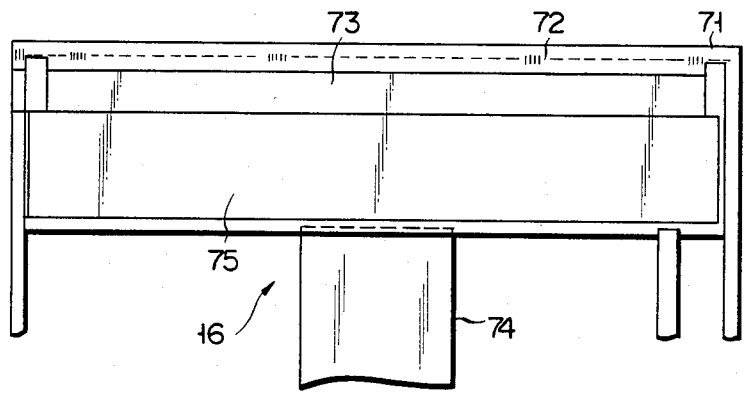
FIG. 9 is a plan view of a thermal head provided in the thermal color printing apparatus of FIG. 2.
Figure 10:
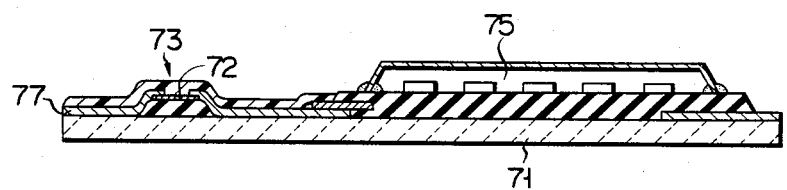
FIG. 10 is a cross sectional view of the thermal head unit of FIG. 9.

As shown in FIGS. 9 and 10, the thermal head unit 16 includes a heating head 73 having 1728 heating elements 72 (equal to the number of the dots) and several tens of lines per mm, which is formed on a substrate 71, and a drive control section 75 for driving the heating head 73. The drive control section 75 is connected to a lead wire 74 and drives the heating head 73 in response to a signal supplied through the lead wire 74.

Figure 11:
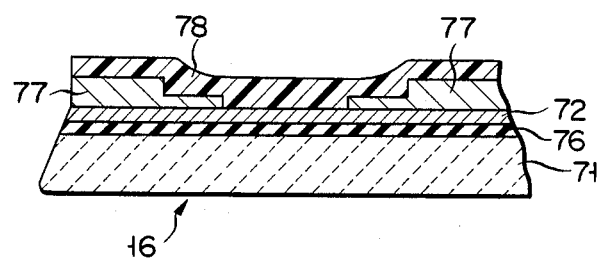
FIG. 11 shows an enlarged view of a heating head of the thermal head unit of FIG. 10.

The heating head 73 includes a graze layer 76 formed on a ceramic substrate 71, and 1728 heating element layers 72 formed on the graze layer 76, as shown in FIG. 11. A pair of electrode layers 77 are formed separately at a given distance on the heating element layers 72. A protect film 78 overlays the heating head 73 for protecting purposes.

Figure 12:
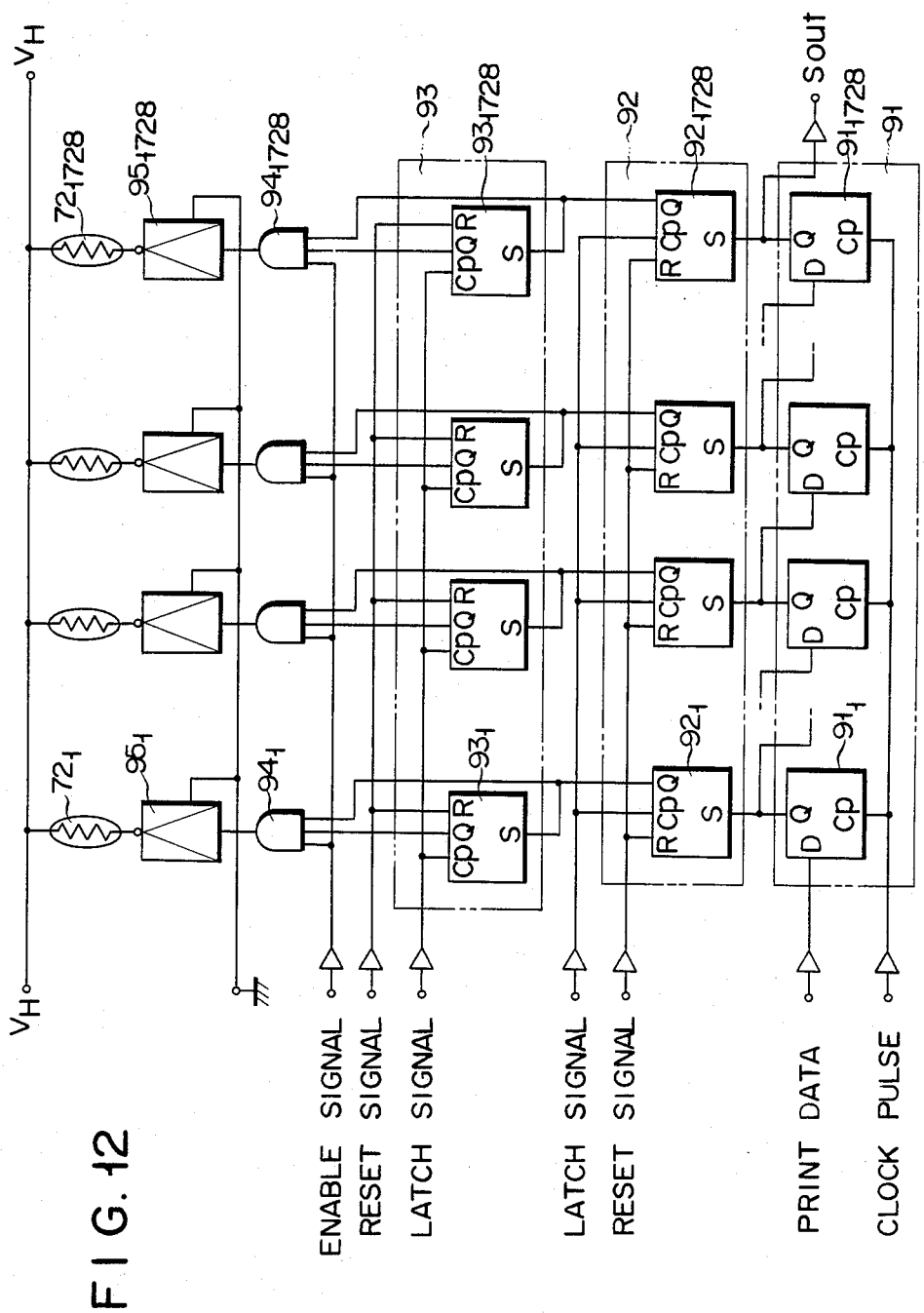
FIG. 12 is a circuit diagram of the thermal head unit of FIG. 9.

FIG. 12 shows a circuit diagram of the thermal head unit. A shift register 91 of 1728 bits contained in the thermal head circuit is made up of 1728 D-type flip-flops $91_1$ to $91_{1728}$. Of these flip-flops 91, a first stage of the flip-flop $91_1$ receives copy data at the terminal D through an inverter. The Q output terminal of the flip-flop $91_1$ is connected to the D terminal of a second stage of the flip-flop $91_2$. Then, the Q output terminal of the second stage of the flip-flop $91_2$ is connected to the D terminal of a third stage of the flip-flop $91_3$. In this way, these flip-flops are changed in successive order. A clock pulse is applied to the Cp terminals of the flip-flops through an inverter. The output terminals of the flip-flops $91_1$ to $91_{1728}$ in the shift register 91, respectively, are connected to the set terminals S of flip-flops $92_1$ to $92_{1728}$ in a latch circuit 92. A rest signal is applied through an inverter to the reset terminal R of the flip-flops $92_1$ to $92_{1728}$. A latch signal is applied through an inverter to the clock terminal Cp of the flip-flops $92_1$ to $92_{1728}$. The output terminals of the flip-flops $92_1$ to $92_{1728}$ are respectively connected to the set terminals of flip-flops $93_1$ to $93_{1728}$ in another latch circuit 93. A latch signal is applied through an inverter to the clock terminals Cp of the flip-flops $93_1$ to $93_{1728}$. A reset signal is supplied to the rest terminals of these flip-flops via an inverter. The output terminals of the flip-flops $93_1$ to $93_{1728}$ are respectively coupled with the second input terminals of AND gates $94_1$ to $94_{1728}$. An enable signal is transferred to the third input terminal of these AND gates, through an inverter. The output terminals of these AND gates $94_1$ to $94_{1728}$ are respectively connected to the input terminals of drivers $95_1$ to $95_{1728}$ with an inverting function. The output terminals of the drivers $95_1$ to $95_{1728}$ are connected through heating elements $72_1$ to $72_{1728}$ respectively to a power source $V_H$.

Figure 13:
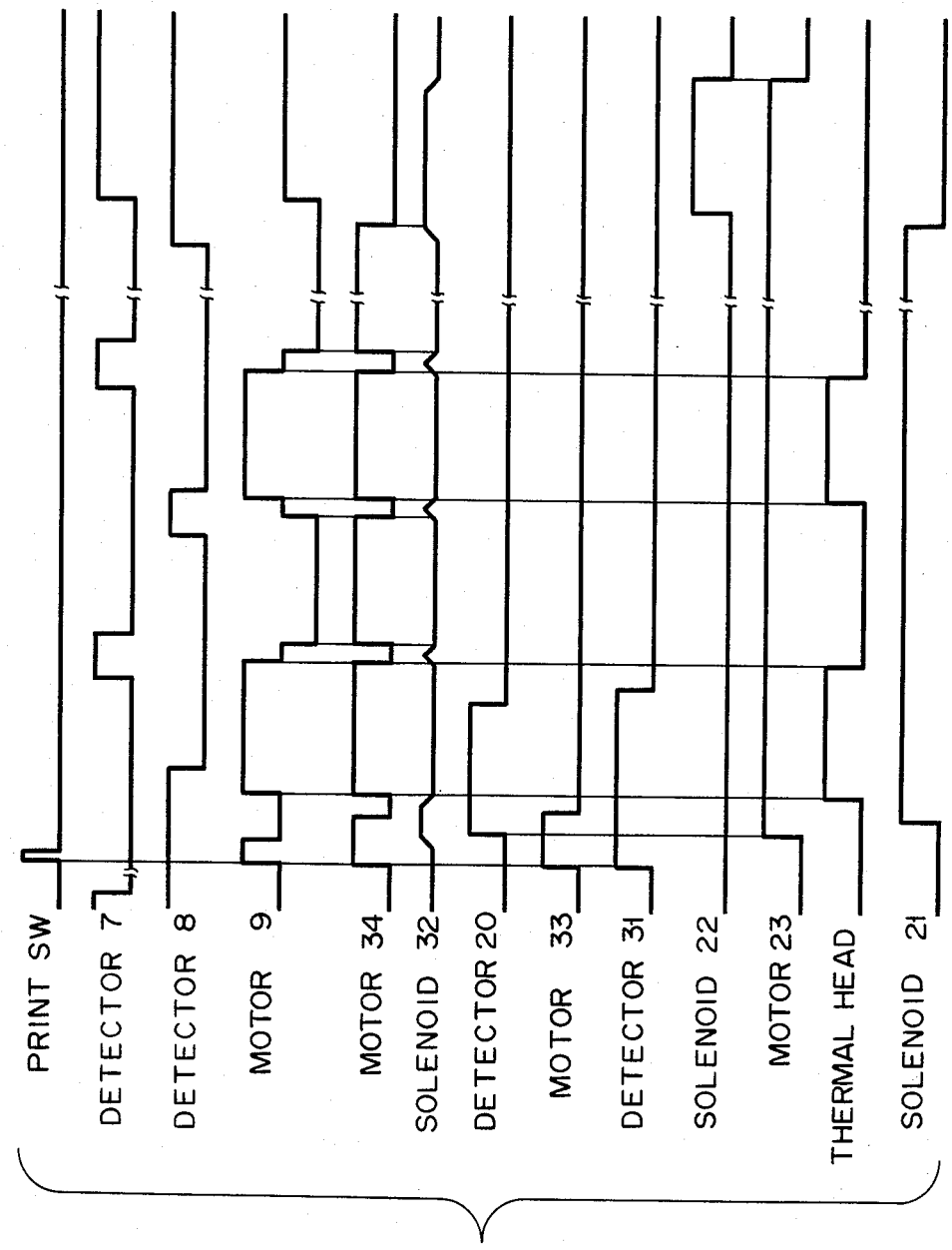
FIG. 13 shows a timing chart useful in explaining the operation of the thermal color printing apparatus of FIG. 2.

The operation of the thermal color printing apparatus thus arranged will be described referring to FIG. 13 illustrating a timing chart.

The document D is placed on the document table 2 and inserted into the document insertion port 3. Under this condition, the copy switch on the keyboard unit 87 is turned on. Upon the turning on of the switch, the CPU 88 gives a drive command to the pulse motor drivers 81, 83 and 90. Then, these motor drivers 81, 83 and 90 drive to rotate the pulse motors 9, 33 and 34, respectively. The forward rotation of the motor 9 rotates the feed roller 4 in the direction of d to feed the document D on the document table 2 to the scanner 5. At this time, the rotation of the motor 33 causes the feed roller 11 to rotate. With the rotation of the feed roller 11, the paper P in the cassette 10 is transferred toward the drum 13. The motor 34 rotates the take-up reel 30. At this time, the detector 31 detects the black of the ink ribbon 17 to produce a detection signal.

When the leading end of the document D reaches the line dot sensor 42 of the scanner 5, the CPU 88 gives a stop command to the pulse motor driver 81. When the paper P is led to the detector 20 through the guide path 12, the CPU 88 gives a drive command to the pulse motor drive 82. When the motor driver 82 rotates the pulse motor 23, the drum 13 rotates. The paper P is transferred to between the drum 13 and the tension roller 14 and is made to intimately contact the drum 13 by the tension roller 14. And the paper P is transferred with the rotation of the drum 13. At this time, the CPU 88 gives a drive command to the solenoid driver 84 which is in turn energized. The solenoid 21 when energized drives the gripper 15 which then grips the leading end of the paper P with the claw 15a (see FIG. 3).

After a given lapse of time since the leading end of the paper P is detected, the CPU 88 gives a stop command to the motor driver 83 to stop the motor 33 and the roller 11.

When the leading end of the black part of the ink ribbon 17 reaches the heating head 73 of the thermal head unit 16, the CPU 88 gives a stop command to the motor driver 90, thereby stopping the motor 34. At the time that the leading end of the paper P is transferred from the detector 20 to the heating head 73 of the thermal head unit 16, the CPU 88 again rotates the motor 9 in the forward direction through the motor driver 81. With the rotation of the motor 9, the roller 4 again rotates to press the document D against the protection glass 46 of the sensor 42 in the scanner 5 to transfer the document D. At this time, the CPU 88 lights all of the LEDs of the LED arrays 49, 50 and 51 in the scanner 5. The light rays from the LEDs are reflected by the document D and condensed by the photosensor array 48 through the rod lens 47. The photosensor array 48 converts white light of the reflecting light into an electrical signal representing a complementray color of white, i.e. black. The image signal from the scanner 5, i.e. the black image signal, is properly processed by the CPU 88 and is supplied as print data to the thermal head unit 16. At this time, the command of the CPU 88 rotates the pulse motor 34 and rotates the feed roller 28 and the take-up roller 30 to move the ink ribbon 17.

Figure 14:
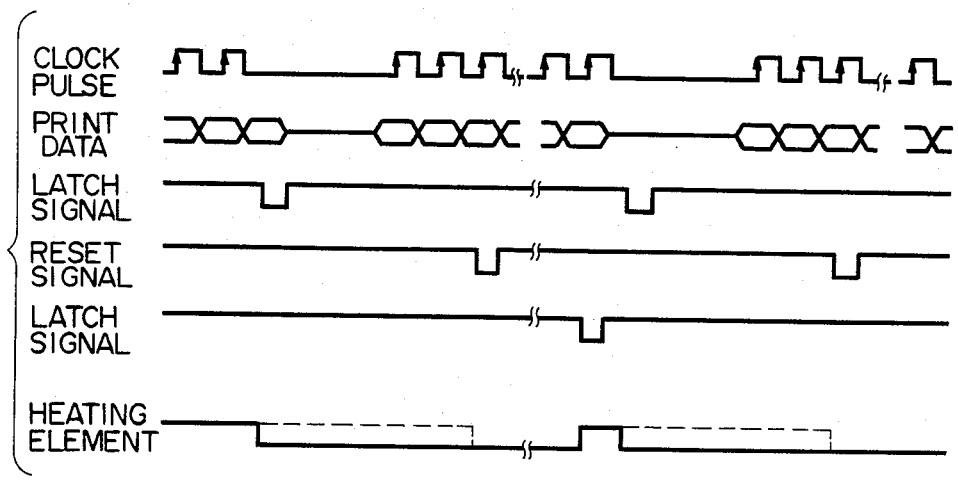
FIG. 14 is a graphical presentation illustrating the operation of the thermal head unit of FIG. 9.
Figure 15A:
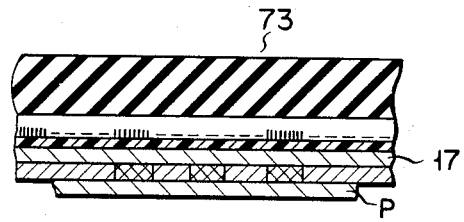
FIGS. 15A and 15B illustrate a process of transferring ink from an ink ribbon to a paper sheet by the thermal head unit.
Figure 15B:

In the thermal head 16, the serial print data, as shown in FIG. 14, is supplied to the shift register 91. The print data is shifted in the shift register 91 in synchronism with the clock pulse. When the print data of 1728 bits corresponding to one line is supplied to the shift register 91, the CPU 88 supplies a latch signal to the latch circuit 92. The latch circuit 92 responds to the latch signal to latch the contents of the shift register 91 therein. At this time, the AND gates $94_1$ to $94_{1728}$ compare the preceeding print data of the latch circuit 93 with the print data. For the present print data, only the AND gates applied with "1" level data are enabled to energize the drivers associated with the enabled AND gates. The drivers 95 feed the heating current to the heating elements 72 associated therewith, respectively. The ink layer 17a of the ink ribbon 17 is pressed against the paper P by the heating head 73 of the thermal head unit 16, as shown in FIG. 15A. When the heating elements 72 are heated, the ink portion of the ink ribbon 17 corresponding to the heating elements 72 is separated from the ink layer and transferred to the paper P, as shown in FIG. 15B. Then, the CPU 88 supplies a reset signal to the latch circuit 93 to reset the latch circuit 93. Then, the latch circuit 93 produces a latch signal which in turn enables the AND gates $94_1$ to $94_{1728}$. As a result, the contents of the latch circuit 92 are supplied to the drivers $95_1$ to $95_{1728}$ through the AND gates $94_1$ to $94_{1728}$, thereby selectively heating the heating elements $72_1$ to $72_{1728}$. As the result of the selective heating of the heating elements $72_1$ to $72_{1728}$, the ink ribbon 17 is transferred to the paper P to effect the dot print. When the CPU 88 supplies the latch signal to the latch circuit 93, the latch circuit 93 latches the contents of the latch circuit 92. Then, every time the CPU 88 supplies the latch signal to the latch circuit 92, the heating elements 72 are heated during a period of time corresponding to the print width according to the present and preceeding print contents. The print signal corresponding to the black color is visualized on the paper P as a print pattern. In a case where the heating elements previously heated must be heated again now, the heating time is shortened to prevent the heating temperature from abnormally rising.

As described above, the patterns corresponding to the black color on the document D are all printed. After a given time lapse since the trailing end of the document D passes the detector 7, that is, immediately before the trailing end of the document D passes the scanner 5, the CPU 88 stops the motor 9 through the motor driver 81. At this time, the CPU 88 stops the pulse motor 34 through the motor driver 90 for stopping the travel of the ink ribbon 17. Further, the CPU 88 energizes the solenoid 32 through the solenoid driver 86. The thermal head unit 16 is separated from the take-up drum 13 by means of the solenoid 32, thereby preventing the paper P on the drum 13 from being broken by the thermal head unit 16.

After the completion of the black color printing, the front end of the paper P reaches the thermal head unit 16. At this time, the CPU 88 gives a command to the motor 9 to reversely rotate. With the reverse rotation of the motor 9, the feed roller 4 rotates in a c direction and the document D is transported in a d direction. At this time, the scanner 5 and the thermal head unit 16 stop its operation. Immediately before the front end of the document D passes the sensor 42 of the scanner 5, CPU 88 stops the reverse rotation of the pulse motor 9. When the leading end of the paper P reaches the heating head 73, the CPU 88 forwardly rotates the pules motor 9. The document D is scanned from the leading end to the trailing end by means of the scanner 5. Also at this time, the switch 62 in the scanner 5 circuit shown in FIG. 8 is closed to energize the LEDs of the LED array 49 for emitting green light. Accordingly, the image signal produced from the scanner 5 becomes an image signal corresponding to magenta as a complementary color of green. According to the magneta image signal, the CPU 88 drives the thermal head unit 16. At this time, the leading end of the magneta portion of the ink ribbon 17 has reached the heating head 73. The ink ribbon 17 is further transported toward the thermal head unit 16, and overlays the paper P printed black. Accordingly, the magneta is dot-printed on the black printed part on the paper P according to the image signal. Immediately before the rear end of the document D passes the sensor 42 of the scanner 5 after the magenta print, the CPU 88 stops the forward rotation of the pulse motor 9 to stop the travel of the document D, and at the same time stops the drive of the scanner 5 and thermal head unit 16. Thereafter, the CPU 88 backwardly rotates the pulse motor 9 to travel the document in the direction b.

When the leading end of the paper P printed with the black and magneta colors reaches the heating head 73, the CPU 88 forwardly rotates the pulse motor 9, and the document D travels in the direction a. At this time, the scanner 5 lights the LEDs 50 of the LED array for blue light emission to scan the document D. Accordingly, the scanner 5 produces an image signal corresponding to the yellow color which is a complementary color of blue. The CPU 88 produces a similar command to print a yellow pattern on the paper P already printed with black and magneta colors.

After the yellow print is completed, cyan as a complementary color of red is dot-printed on the paper P. In this case, the scanner 5 is driven to light the LEDs 49 for red light emission and scans the document D with the red light, and produces an image signal representative of cyan as a complementary color of red. Responsive to the cyan image signal, the CPU drives the thermal head unit 16. As a result, the cyan is dot-printed on the paper P, while superposing the black, magenta and yellow patterns.

After completion of the four colors printing operation, the front end of the paper P reaches the claws 18. At this time, the CPU 88 issues a solenoid erase command to the driver 84. When the solenoid driver 84 is deenergized the solenoid 21, the gripper 15 having the paper P gripped therewith is released from its gripping state. At this time, the CPU 88 applies a drive command to the solenoid driver 85. When the solenoid driver 85 energizes the solenoid 22, the separation claws 18 intimately contact the drum 13 and separate the paper P from the drum 13, and lead the paper P to the discharge tray 19. At this time the document D is discharged from the port 6.

As described above, the scanner repeatedly scans the document with different colors, thereby producing color image signals corresponding to the complementary colors of the scanning colors. The thermal head unit is driven according to the color image signals in progressive order. As a result, the color patterns corresponding to the color image signals are successively and superposedly printed on the paper, thereby forming color printed matter. The embodiment of the thermal color printing apparatus as mentioned above is simple in construction and low in cost, and does not require a complicated control. This leads to the improvement of a reliability and simplifies maintenance.

In the present embodiment, for forming the color image signals, the color document is illuminated with light and the reflecting light is converted into electrical signals. An intensity of the reflecting light changes depending on colors. Therefore, if the thermal head unit is driven by the image signals, the colors at high reflectance are intensified. The result is that a distribution of the color intensity in the reproduced color image is different from that of the color image on the document. For solving this problem, it is a common practice to adjust the calorific value of the heating elements of the thermal head unit according to the color signals. To this end, a variable voltage power source 80 (FIG. 4) is used for the power source connected to the heating elements of the thermal head 16. The variable voltage power source 80 is controlled in such a way that the power source 80 supplies a voltage set according to the color printed to the thermal head 16. The heating elements $72_1$ to $72_{1728}$ of the thermal head 16 are heated to provide the calorific value as given by the supplied voltage. The ink ribbon 17 transfers an amount of ink corresponding to the calorific value to the paper P. In this way, the change in the level of the image signal due to the color difference can be corrected to obtain an optimum color print.

Alternatively, the correction of the image signal level change due to the color difference may be realized by changing an amount of the ink of the ink ribbon and/or a viscosity of the ink. The ink layer of yellow as a complementary color of blue with a small amount of reflecting light is thicker. The viscosities of the color inks are so arranged low to high from the first transferred color to the last transferred one, i.e. in the order of black, magenta, yellow and cyan. With this gradation of the viscosities of the color inks, the yellow ink as a complementary color of blue is transferred with the same thickness as those of the remaining colors. Further, a thin color such as yellow is prevented from being buried in the ground color of magenta and black. To be more specific, the thickness and viscosity of black, magenta, yellow and cyan are as follows:

|  | Thickness | Viscosity |
| --- | --- | --- |
| Black | 3.5 g/cm$^2$ | 80 cps |
| Magenta | 4 g/m$^2$ | 80 cps |
| Yellow | 5 g/m$^2$ | 60 cps |

| | Thickness | Viscosity |
|---|---|---|
| | *-continued* | |
| Cyan | 3 g/m² | 100 cps |

Thus, the change in the image signal levels due to the color difference may be corrected if the calorific value of the thermal head unit is fixed, by changing the thickness and the viscosity of the inks for every color.

Another embodiment will be described referring to FIG. 16 illustrating a timing chart.

Figure 17:
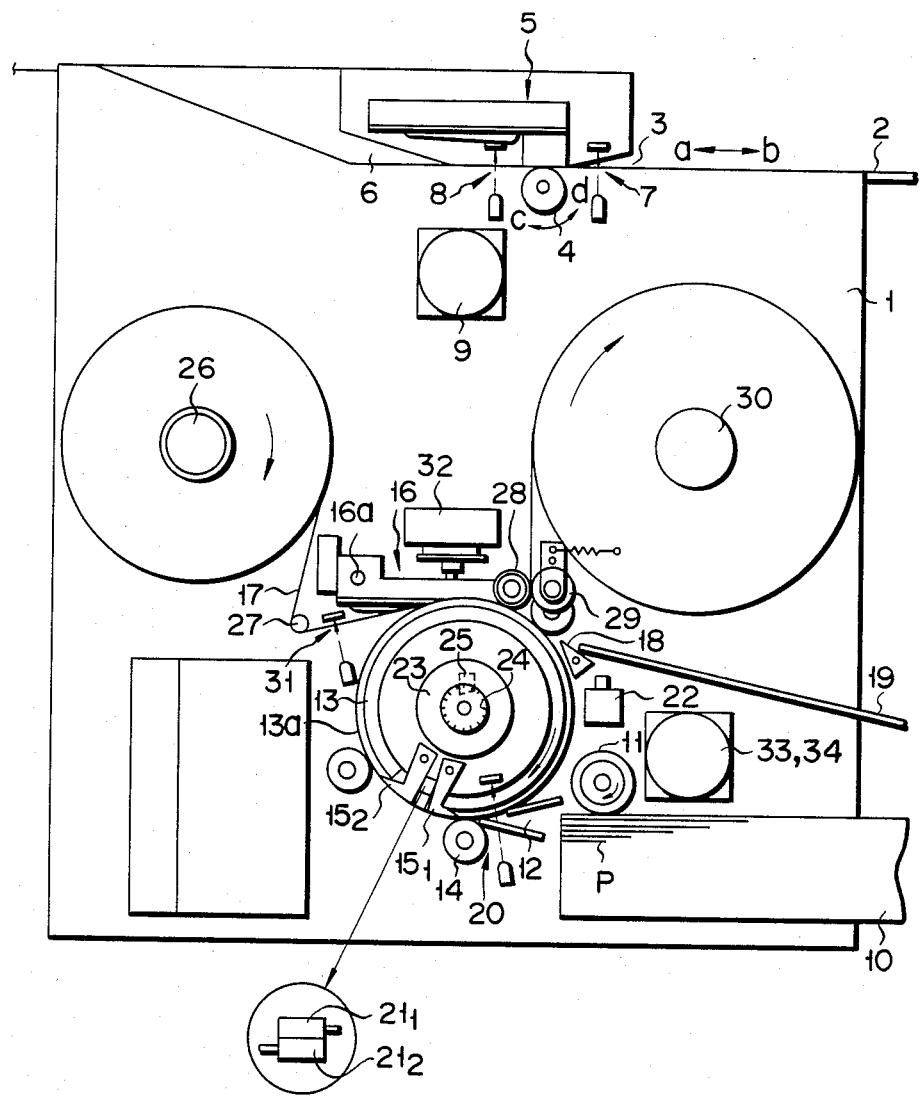
FIG. 17 schematically illustrates the color printing apparatus operable according to a sequence as given by the timing chart of FIG. 16.

The take-up drum 13 is provided with front end grippers $15_1$ and $15_2$ so that both ends of the paper P are fastened to the take-up drum 13, as shown in FIG. 17. The front end of the paper P transferred to and pressed against the drum 13 by the rollers 11 and 14 is gripped by the gripper $15_1$ driven by the solenoid $21_1$ associated therewith. Under this condition, the leading end of the paper P is transferred to the thermal head unit 16 with the rotation of the take-up drum 13. At this time, the thermal head unit 16 starts the black dot print. The motor 9 rotates forward to transfer the document D in the direction a. In response to the image signal from the scanner 5, the moving paper P is printed by the thermal head unit 16. With the advance of the paper P, the rear end of the paper P is caught by the gripper $15_2$. At this time, the solenoid $21_2$ operates to drive the gripper $15_2$ to grip the rear end of the paper P. Under this condition, the paper P is transferred to the thermal head unit 16 with the rotation of the drum 13. At a given time after the rear end of the document D is detected by the detector 7, that is, immediately before the rear end of the document D passes the scanner 5, the CPU 88 reverses the rotation of the pulse motors 9 and 23. At this time, the CPU 88 stops the pulse motor 34 through the motor driver 90, and also energizes the solenoid 32 through the solenoid driver 86. As a result, the travel of the ink ribbon 17 stops. The thermal head 16 is swung upwardly about the shaft 16a by means of the solenoid 32 and departs from the drum 13. Further, the thermal head stops its operation. Under this condition, the document D is returned to its original position in a direction b and the rotation of the take-up drum 13 is reversed.

At a given time after the front end of the document D has been detected by the detector 8, that is, immediately before the front end of the document passes the scanner 5, the CPU 88 forwardly rotates the motors 9 and 23. At this time, the CPU 88 also deenergizes the solenoid 32 and rotates the motor 34. As a result, the heating head 73 of the thermal head unit 16 presses the ribbon 17 and the paper sheet P against the take-up drum 13. During the travel of the ink ribbon 17 and the paper P under this condition, the magenta of the ink ribbon 17 is dot-transferred to the paper P to print a magenta pattern on the paper sheet. Immediately before the rear end of the document D passes the thermal head 16 after the end of the magenta print, the pulse motors 9 and 23 are reversely rotated and the front ends of the document D and the paper P are moved to the read and print start positions, respectively. Subsequently, a similar operation follows to effect the yellow print. Then, the motors 9 and 23 repeat the forward rotation and the backward rotation to effect the cyan print. At this point, one cycle of the color print ends. The deenergization and energization of the solenoid 32 and the forward and reverse rotation of the motor 34 are repeated in synchronism with the forward and reverse rotations of the motors 9 and 23. When the final print of cyan is completed, the document D is discharged into the document discharge port 6. The paper P is separated from the drum 13 by the separation claw 18 and is then transferred to the printed paper tray 19. At this time, the grips $15_1$ and $15_2$ are released from their gripping state by deenergization of the solenoids $21_1$ and $21_2$.

If the document pattern is read from the document D and printed in black on the paper P while the document D and paper P are moving in forward direction and the document pattern is read and printed in magenta on the paper P while the document D and paper P are moving in reverse direction, the print speed will be doubled. In this case, the document D is scanned by the scanner 5 from its rear end while it is moving in direction b. At the same time, the thermal head unit 16 performs the magenta print on the black-printed paper P from the rear end of the paper P laid on the drum 13 rotating in the reverse direction. Before the magenta print is performed while the document D and paper P are moving in reverse direction, the ink ribbon 17 is fast fed for one-frame (i.e. one magenta frame) distance while the thermal head unit 16 is moved away from the drum 13 by the solenoid 32. The ink ribbon 17 is then made to travel in reverse direction together with the paper P. Upon completion of the magneta print, the magenta frame needs to be moved forward. Similarly, the yellow and cyan prints are achieved while the document D and paper P are moving in forward and reverse directions, and thus the print speed is doubled.

In the above-mentioned embodiment, the image signals are sequentially produced for every color. Alternatively, the reflecting light from the document is split into red, blue and green. These split lights are converted into image signals by image sensors, for example, CCD, provided corresponding to three colors. This will be described hereinafter.

Figure 18:
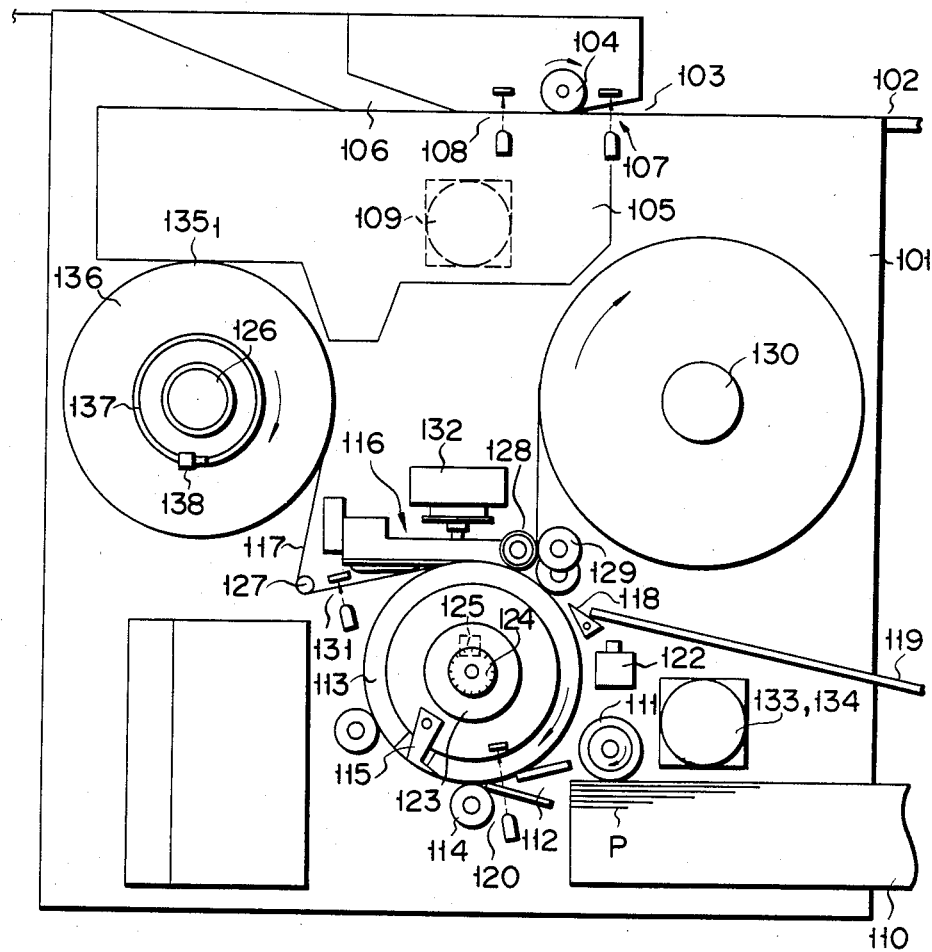
FIG. 18 schematically illustrates another embodiment of a color printing apparatus for splitting the reflecting light from a document into several colors according to the present invention.
Figure 19:
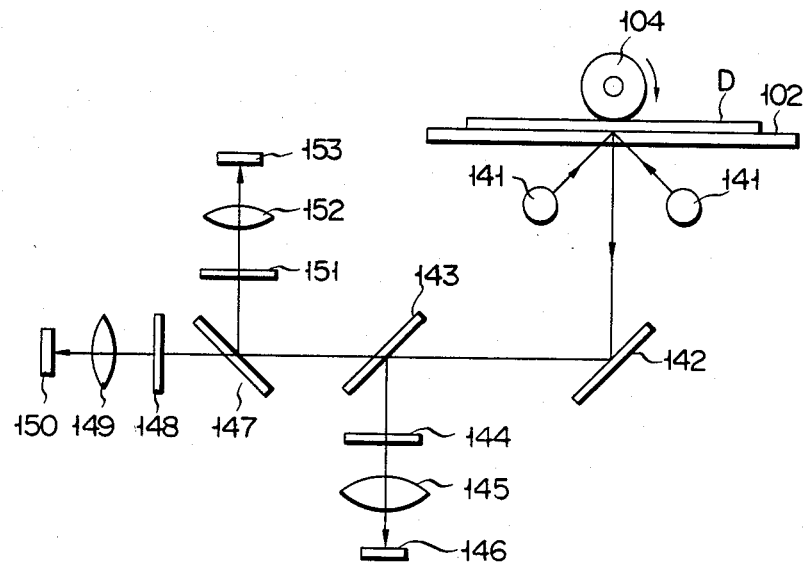
FIG. 19 is a schematic illustration of an optical system for light splitting in an optical system used in the printing apparatus of FIG. 18.

As shown in FIG. 18, a scanner 105 is provided under the document table 102. The document D is transferred toward the scanner 105 by means of the feed roller 104 provided on the document table 102. As shown in FIG. 19, the scanner 105 is provided with a mirror 142 slanted by 45° with respect to the document table 102 and two fluorescent lamps 141 provided under the document table 102. Half mirrors 143 and 147 are successively disposed slanted by 45° with respect to the reflecting optical path of the mirror 142. A blue band pass filter 144, a lens 145 and an image sensor such as a CCD are disposed on the reflecting optical path of the half mirror 143. A green color band pass filter 148, a lens 149 and an image sensor 150 are arranged on the transmission optical path of the half mirror 147. A red color band pass filter 151, a lens 152 and an image sensor 153 are arranged on the reflecting optical path of the half mirror 147. Each of the image sensors 147, 150 and 153 is an array of 1728×2400 bits.

Figure 20:
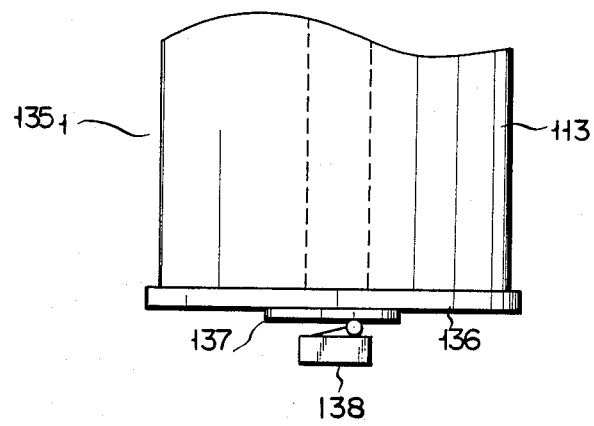
FIG. 20 is a side view of a color ribbon roll loaded into the printing apparatus of FIG. 18.

A monochrome e.g. black ink ribbon $135_1$ or a color ink ribbon $135_2$ is selectively set to the ink ribbon reel 126. The black ink ribbon $135_1$ is provided with only a black ink layer. The color ink ribbon $135_2$ is provided with the four color ink layers, shown in FIG. 5. A ring-like member 137 is mounted on the side plate of the black ink ribbon $135_1$, as shown in FIG. 20. The color ink ribbon $135_2$ is not provided with the member 137. The presence or absence of the member 137 is detected by a microswitch 138 which detects the type of ribbon, monochrome or color.

Figure 21:
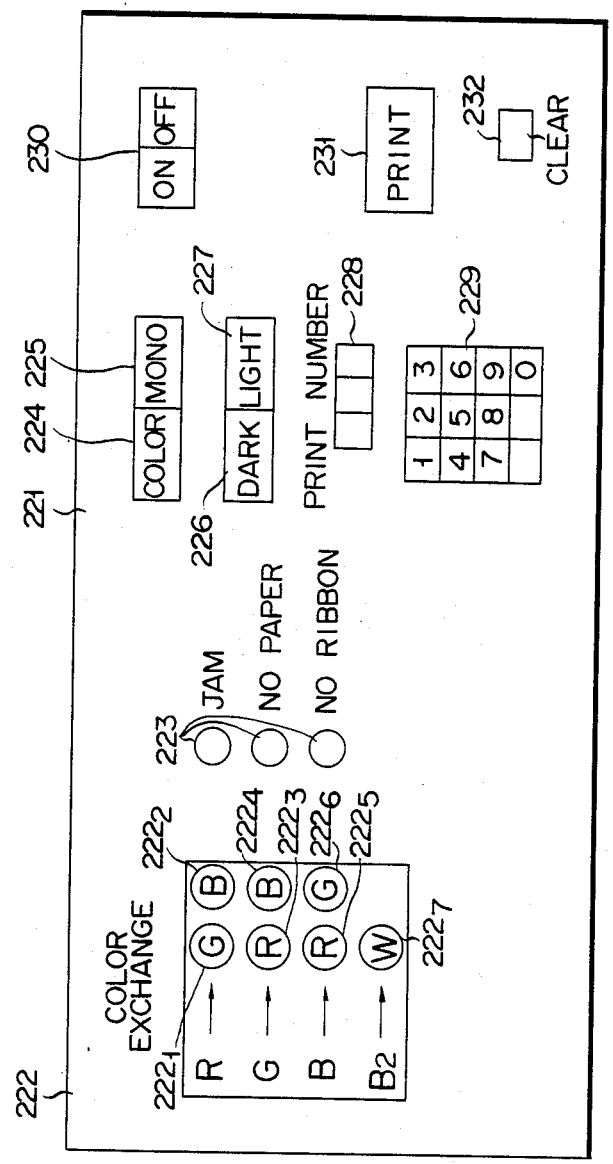
FIG. 21 shows a plan view of a keyboard unit of the color printing apparatus of FIG. 18.

A keyboard unit 221 provided on the main frame 1 is illustrated in FIG. 21. The keyboard unit 221 has a color selector 222. The color selector 222 contains a red to green switch key $222_1$, a red to blue switch key $222_2$, a green to red switch key $223_3$, a green to blue switch key $224_4$, a blue to red switch key $222_5$, a blue to green switch key $222_6$ and a black to white switch key $222_7$. An abnormal indicator 223 indicates "JAM", "NO PAPER", and "NO RIBBON". A color print key 124 and a monochrome print key 225 are for designating a color print mode and a monochrome print mode, respectively. A dark key 226 and a light key 227 are for designating shades of the print, dark and light respectively. A print number display 228 displays the number of prints designated by a ten key 229. The number of prints is decremented one for each print. A power switch is for power on or off. A clear key 232 clears the print number displayed. The keys $222_1$ to $222_7$ and 224 to 227 are of the self illumination type.

Figure 22:
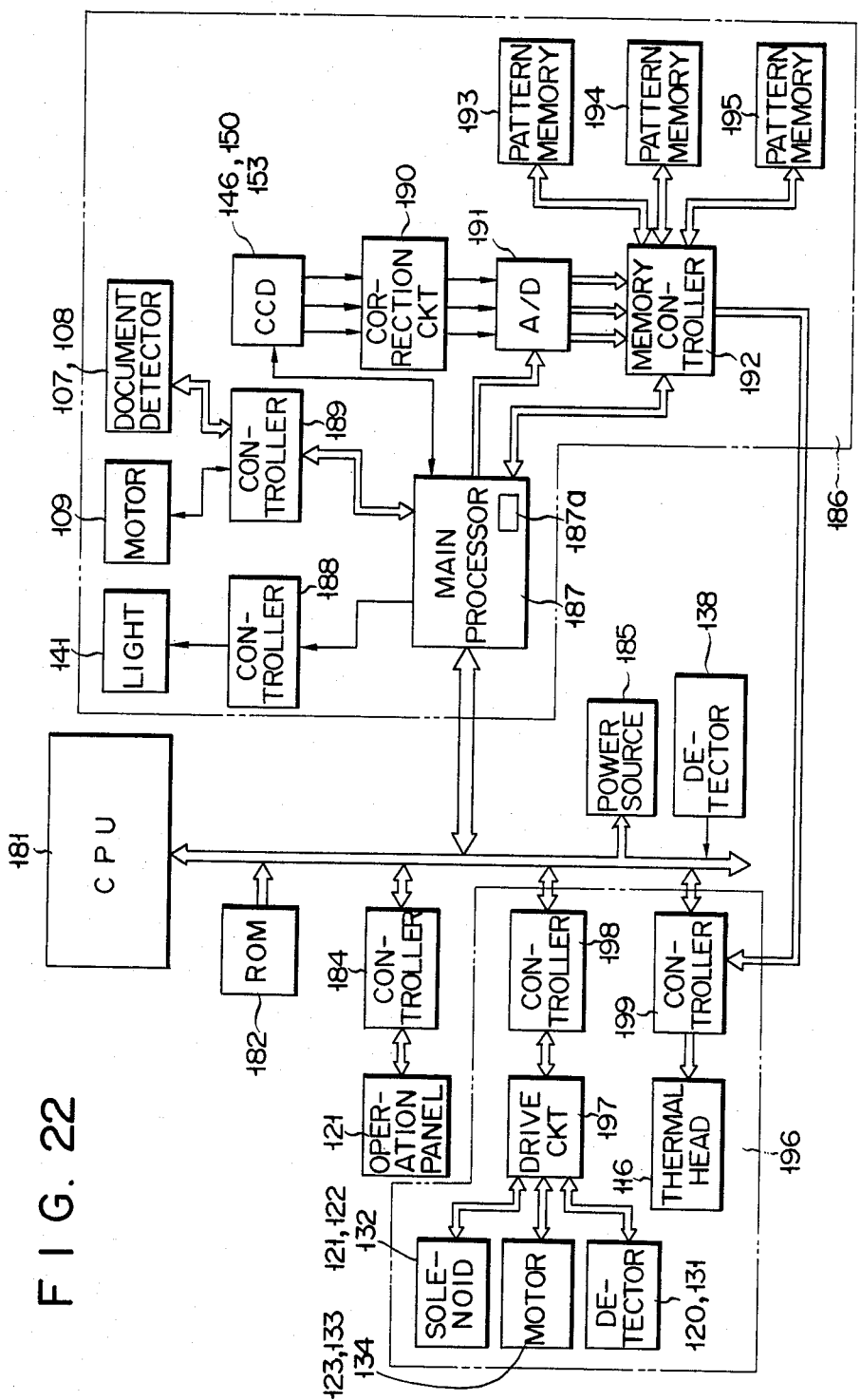
FIG. 22 is a block diagram of a control system in use for the color printing apparatus of FIG. 18.

Referring to FIG. 22, there is shown a control system for the color printing apparatus as mentioned above. The CPU 181 is connected to a ROM 182 for storing a program to perform the printing operation, through a bus. Connected to the CPU 181 are a controller 184 for controlling the keyboard unit 221 and a printing section 196. The printing section 196 includes solenoids 121, 122 and 132, the pulse motors 123, 133 and 134, a drive circuit 197 for driving the detectors 120 and 131, and the thermal head unit 116. The drive circuit 197 and the thermal head unit 116 are connected to the CPU 181 through the controllers 198 and 199. The CPU 181 is also connected to a main processor 187 in a reading section 186. The main processor 187 turns on and off the fluorescent lamps 141 through a controller circuit 188, and drives the pulse motor 109 and the document detectors 107 and 108 through a controller circuit 189. The main processor 187 is coupled with CCD image sensors 146, 150 and 153. The CCD image sensors 146, 150 and 153 are connected to pattern memories 193, 194 and 195 for storing red, green and blue image signals, through a correction circuit 190, an A/D converter section 191 and a memory controller 192. The pattern memories 193, 194 and 195 each have an array of 1728×2400 bits for storing 2-bit digital signals.

Figure 23:
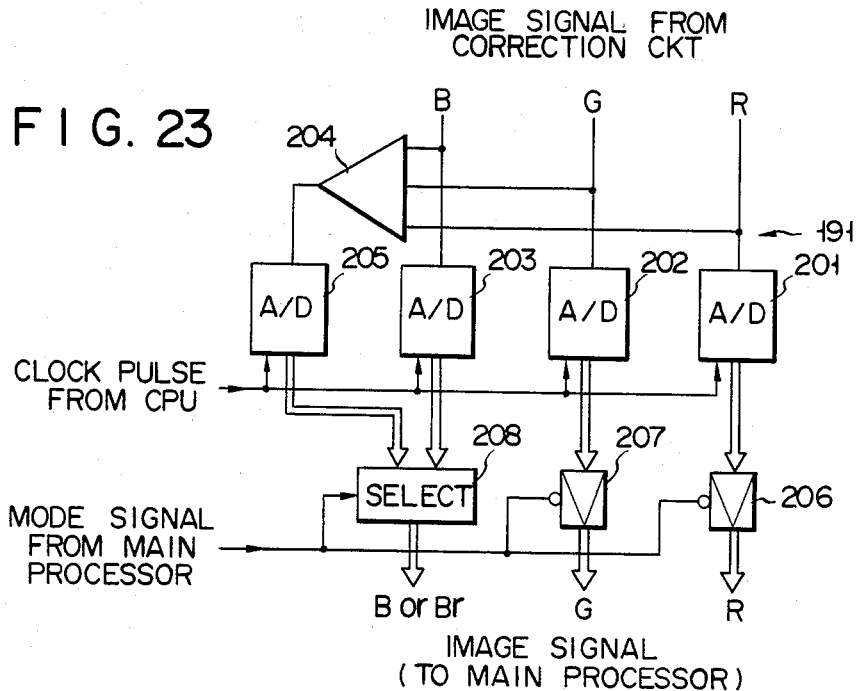
FIG. 23 is a circuit diagram of an A/D converter section of the printing apparatus of FIG. 22.

As shown in FIG. 23, the A/D converter section 191 is comprised of A/D converters 201, 202 and 203 for A/D converting red, green and blue image signals from the correction circuit 190, and an A/D converter 205 for A/D converting a black signal formed by adding the red, green, and blue signals by an adder/amplifier 204. These A/D converters 201, 202, 203 and 205 slice the analog signal of each bit from the CCD at two different levels into a 2-bit digital signal. The output terminals of the A/D converters 201 and 202 are connected to gate circuits 206 and 207, respectively. The output terminals of the A/D converters 203 and 205 are connected to the input terminal of the selector 208. Each of the A/D converters 201 to 203 and 205 convert an input signal into an "11" signal when the input signal is higher than a high slice level. The same converts it into a "10" signal when it is between the high and low levels. The same converts it into "00" when it is lower than the low slice level.

Figure 24:
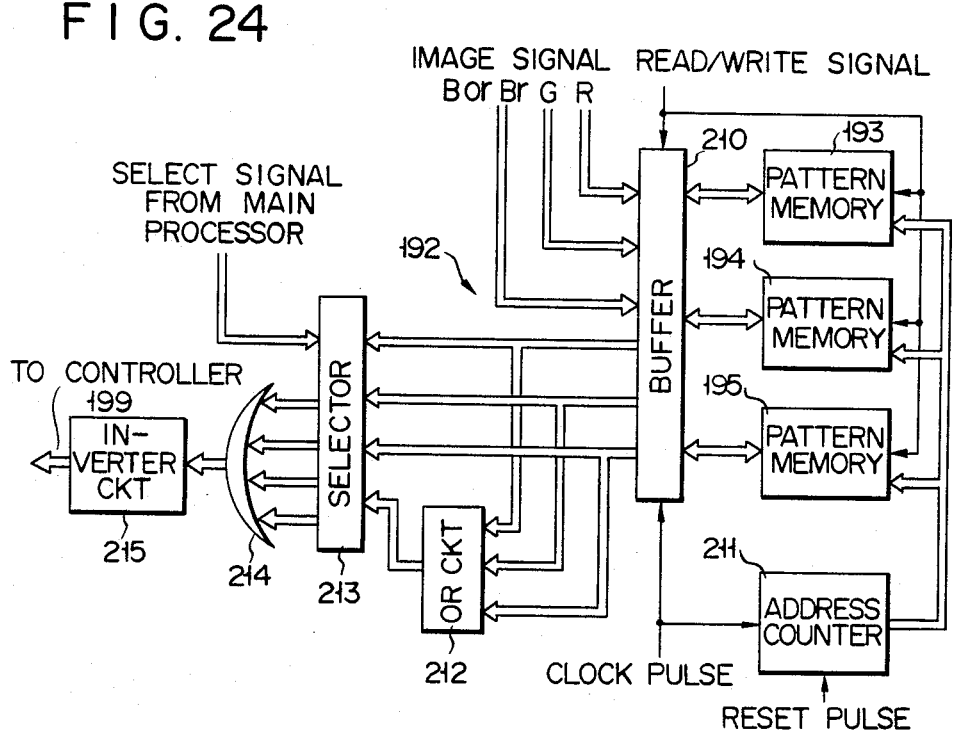
FIG. 24 is a circuit diagram of a memory control section of the printing apparatus of FIG. 22.
Figure 25:
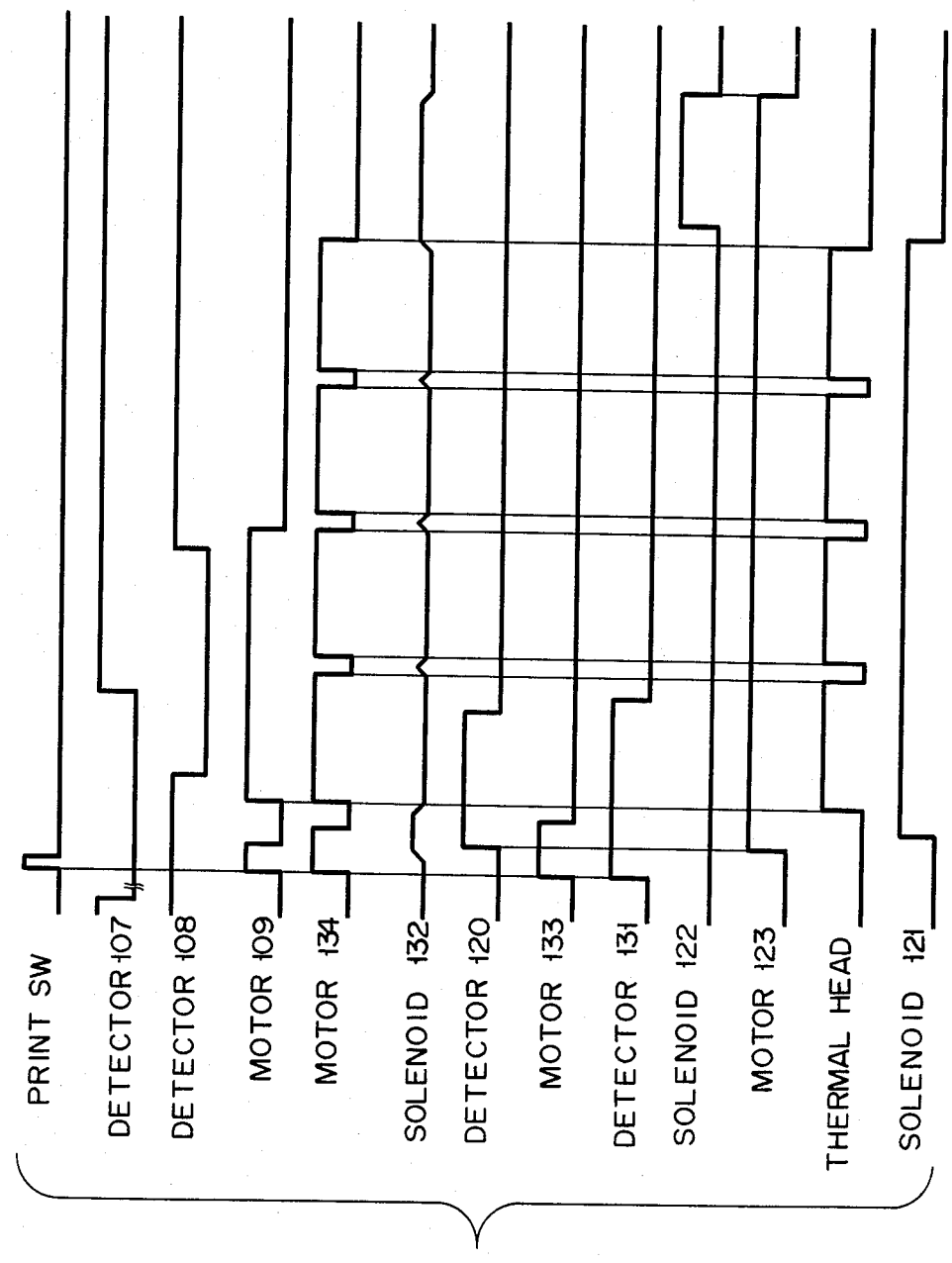
FIG. 25 is a timing chart useful in explaining the operation of the printing apparatus of FIG. 22.

A detailed circuit of the memory control section 192 is illustrated in FIG. 24. As shown, the color image signals from the A/D converter section 191 are supplied to a buffer 210. The buffer 210 is bidirectionally connected to the pattern memories 193, 194 and 195. An address counter 211 is connected to address input terminals of the memories 193, 194 and 195. The output section of the buffer 210 is connected to the input ports of an OR circuit 212 and a selector 213. The OR circuit 212 produces an "11" signal to a selector 213 when the 2-bit image signals of red, blue and green each contain "1". The selector 213 is arranged so as to select the respective color signals according to the select signals from the main processor 187. The output port of the selector 213 is connected to an inverter circuit 215, through the OR circuit 214. The output port of the inverter circuit 215 is coupled with a thermal head controller 199 of the printing section 196. The inverter circuit 215 inverts a color signal from the OR circuit 214 to form a signal representing an amount of color ink attached. For example, the converted signal is represented by "11" for a dark, "01" for bright, and "00" for nonshade.

The operation of this color printing apparatus will be described referring to FIGS. 18 to 24.

A roll of the color ink ribbon $135_1$ is loaded into the ink ribbon reel 126. The type of the color ribbon roll is detected by the detector 138. The document D is inserted into the document insertion port 103 and the print key 231 is operated. The CPU 181 sets up a color mode responsive to the signal from the detector 138, and applies a color mode signal and a read start signal to the main processor 187. The main processor 187 loads these signals into the register 187a and drives the pulse motor 109 through the controller 189. The pulse motor 109 rotates the feed roller 104 in the direction of arrow shown in FIGS. 18 and 19 to transfer the document D to the scanner 105. At this time, the CPU 181 drives the pulse motor 33 for rotating the take-up roller 111. The take-up roller 111 takes up the paper P from the cassette 110. When the document D reaches the scanning position, the main processor 187 stops the pulse motor 109 for stopping the rotation of the roller 104. When the paper P is guided to the detector 120 through the guide way 112, the CPU 181 responds to a paper detection signal from the detector 120 to drive the pulse motor 123 to rotate the take-up drum 113. At a given time after the front end of the paper P is detected by the detector 120, the CPU 181 stops the pulse motor 133 for stopping the take-up roller 111. The front end of the paper P closely contacting the take-up drum 113 is fastened to the drum 113 by the gripper 115 driven by the CPU 181.

When the print key 231 is operated, the CPU 181 drives the pulse motor 134 through the controller 198 and the drive circuit 197. Then, the feed roller 129 and the take-up reel 130 are rotated and the ink ribbon 117 travels. After a period of time from the detection of the front end of the black section of the ink ribbon 117 by the detector 131 until this front end is transferred to the heating section of the thermal head 132, the CPU 181 stops the pulse motor 134 and the travel of the ink ribbon 117. Following this, the front end of the paper P reaches the heating section of the thermal head 132. The CPU 181 then drives the pulse motors 109 and 134. As a result, the feed roller 104 rotates again and the document D travels on the scanner 105, as shown in FIG. 18. In the scanner 105, the fluorescent lamps 141 illuminate the document D and the reflecting light from the document D is led to the half mirrors 143 and 147 by the mirror 142. The reflecting light from the half mirror 143 is partially led to the CCD image sensor 146 through the band pass filter 144 and the lens 145. The band pass filter 144 allows only the blue light to pass therethrough. Accordingly, the CCD image sensor 146 produces an image signal representing a blue pattern component of the document pattern. Similarly, the CCD image sensors 105 and 153 produce an image signal representing green and an image signal representative of red.

The image signals representative of blue, green and red image signals from the CCD image sensor 146, 153 and 150 are supplied to the correction circuit 190, as shown in FIG. 22. The correction circuit 190 performs the shading correction and the gain control. The image signals R, G and B from the correction circuit 190 are supplied to the A/D converters 201, 202 and 203 in the A/D converter section 191 and to the adder/amplifier circuit 204, as shown in FIG. 23. An addition image signal from the adder/amplifier circuit 204 is applied to the A/D converter 205. The A/D converters 201 to 203 convert the red, green and blue image signals into 2-bit digital signals and apply the converted signals to the gate circuits 206 to 208. The addition signal from the adder/amplifier circuit 204 is supplied as a black image signal to the A/D converter 205 where it is converted into a 2-bit digital signal. A black digital image signal from the A/D converter 205 is supplied to the selector 208. At this time, the print mode of the apparatus is the color print mode. Therefore, the color mode signal of logical level "1" is supplied to the gate circuits 206 and 207, and the selector 208. The digital image signals R, G and B from the A/D converters 201 to 203 are supplied to the buffer (FIG. 24) in the memory control section 192.

The buffer 210 temporarily stores the digital image signals R, G and B supplied sequentially in synchronism with the clock pulse from the main processor 187. The image signals R, G and B stored in the buffer 210 are stored in the pattern memories 193 to 195 according to a count of the address counter 211. The address counter 211 performs the count operation in synchronism with the clock pulses from the main processor 187. The image signals R, G and B read out from the buffer 210 are supplied to the selector 213 and the OR circuit 212 successively. The output signal from the OR circuit 212 is supplied as a black signal of the four color image signals to the selector 213. The selector 213 responds to the black selection signal from the processor 187 to produce a black signal. The black signal is supplied through the OR circuit 214 and the inverter 215 to the controller 199 of the print section 196 (FIG. 22). The controller 199 responds to the black image signal to drive the thermal head 116 every line (1728 bits). At this time, the pulse motor 134 is driven to rotate the feed roller 128 and the take-up reel 130 and to transport the ink ribbon 117. A dot pattern corresponding to the black image signal is formed on the paper P with the transfer of the black ink.

At a given time after the rear end of the document D is detected by the detector 107, that is, after the document D is discharged from the discharge port 106, the CPU 181 stops the pulse motors 109 and 134, and the feed roller 104 and the ink ribbon 117. Further, the CPU 181 drives the solenoid 132 through the driver 197. The solenoid 132 separates the thermal head unit 116 from the take-up drum 113 to remove the transfer resistance of the paper.

The take-up drum 113 transfers the paper P and the front end of the paper reaches the heating head of the thermal head unit 116. At this time, the main processor 187 produces a select signal for selecting the green image signal to the selector 213 of the memory controller 192. Via the green select signal, the selector 213 successively selects the green image signal from those image signals for red, green and blue supplied from the pattern memories 193, 194 and 195 through the buffer 210, and supplies the selected signal through the OR circuit 214 to an inverter 215. The inverter 215 supplies the print signal of magenta as a complementary color of green to the controller 199. The thermal head unit 116 is driven by the magenta print signal. At this time, the heating elements are supplied with the voltage $V_H$ or $V_H'$ according to a depth of colors of the document pattern. As a result, the magenta ink of the color ink ribbon $135_2$ is printed superposed on the black dot pattern printed, as a dot pattern.

Similarly, the dot pattern of yellow and the dot pattern of cyan are printed superposed on the previous color dot patterns. After all of the color dot patterns are printed on the paper P, the gripper 115 is released and the claws 118 peel the paper P from the take-up drum 113. The paper P is then discharged into the paper discharge tray 119.

Through the operation, the color print corresponding to the color of the document pattern is obtained. A color print can be obtained by properly changing the color. This will be described.

For changing the red and green to blue, and blue to red, after the document D is inserted into the document insertion port 103, the select keys $222_2$, $222_4$ and $222_5$ are pushed and finally the print key 231 is pushed. In this case, the similar operation to that as mentioned above is performed to store the image signals representing red, green and blue in the pattern memories 193, 194 and 195, and also is supplied to the selector 213. At this time, the main processor 187 produces a select signal corresponding to the black color. The selector 213 selects the black signal from the OR circuit 212, and applies this through the OR circuit to the inverter 215. Then, the take-up drum 113 rotates and the front end of the paper P reaches the heating head. At this time, the main processor 187 produces no select signal to the selector 213. Accordingly, the thermal head unit 116 is not driven and the paper P is not printed with the magenta color of the ink ribbon 117. The paper P rotates once with the rotation of the take-up drum 113. When both the front ends of the paper P and yellow ink layer reach the heating head, the main procesosr 187 applies green and red select signals to the selector 213. The selector 213 selects R, G and B image signals supplied from the pattern memories 193 to 195 and the black image signal derived from the OR circuit 212, and supplies these signals to the inverter 215 through the OR circuit 214. The inverter 215 converts the R and G image signals into a print image signal corresponding to the yellow color as a complementary color of the B image signal. The print converted image signal drives the thermal head 116 unit through the controller 199. Accordingly, the yellow ink is printed on the paper P, superposed on the black dot print. In this case, the voltage $V_H$ or $V_H'$ is applied to the thermal head unit 116 according to a depth of each of the red and green patterns of the document pattern, and the yellow ink is transferred to the paper P in a depth corresponding to the applied voltage.

After the transfer of the yellow ink, the paper P is transferred by the take-up drum 113, and the leading end of the paper P reaches the heating portion of the thermal head unit 116. At this time, the main processor 187 supplies the blue select signal to the selector 213. Accordingly, the selector 213 supplies the G image signal to the inverter 215 through the OR circuit 214. The inverter 215 converts the G image signal into a print image signal corresponding to cyan as a complementary color of the blue color. The thermal head unit 116 is driven by the cyan print image signal, so that the cyan ink is dot-printed on the paper P. The cyan dot pattern corresponding to the blue pattern is printed superposed on the black and yellow dot patterns.

Through the color print operation, the red and green patterns on the document are converted into a yellow pattern and the blue pattern is converted into a cyan pattern. Thus, the black, yellow and cyan color patterns are formed.

As described above, a color print with a color pattern different from that of the document D may be obtained by selectively pushing the color select keys $222_1$ to $222_7$ in the color selector 222.

The operation of the apparatus when the monochrome print mode is set up will be described. In this case, when the black ink ribbon roll $135_1$ is set to the reel 126, the monochrome mode is set up in the apparatus. The operation similar to that in the color print mode is performed until the image signals R, G land B are supplied to the A/D converter section 191 after the print key 231 is pushed. In the A/D converter section 191, the selector 208 selects the output signal or the black image signal from the A/D converter, in response to the mode signal from the main processor 187, i.e. monochrome mode signal. At this time, the image signals R and G are not applied to the memory section 192.

The black signal selected by the selector 208 is stored into the pattern memory 195 through the buffer 210 and also applied to the selector 213. The black image signal is supplied to the selector 213 through the gate circuit 212. Since the black selection signal is applied to the selector, the black signal applied through the OR circuit 212 is selected by the selector 213 and is applied to the inverter 215 through the OR circuit 214. The printing section 196 responds to the black image signal to dot-transfer the black ink on the paper P, thereby to print a black dot pattern corresponding to the document pattern.

After the monochrome pattern is printed, the CPU 181 performs a sequence of the above-mentioned operations in the process from the separation of the paper P from the drum 113 until the paper P is discharged.

As described above, the monochrome print is obtained through one cycle of the print operation. For performing the monochrome mode using the black ink section on the color ink ribbon, the monochrome key 225 on the keyboard unit 222 is pushed. In this case, the remaining color layers of magenta, yellow and cyan are fed while not used, and the next black ink section is made close to the thermal head unit 116.

In the above-mentioned embodiment, the monochrome mode is executed using the black ink layer. This may of course be made using another color of magenta, yellow or cyan.

According to the present invention as mentioned above, the scanner scans the document to produce different color image signals corresponding to the color pattern of the document. The ink ribbon with color ink layers corresponding to the color image signals is made to closely contact the paper. The color inks of the ink ribbon are transferred onto the paper P for each color, thereby to give a color print on the paper. Thus, the color printing apparatus simplifies the structure and the control system. This leads to improvement of reliability, no maintenance, and further low cost to manufacture.

The four colors used for the color printing in the above-mentioned embodiment may be replaced by two, three, or more than four colors. The order of the color ink layers on the ink ribbon may properly be set. A depth of the ink printed is changed by changing a calorific value of the thermal head, but this may be adjusted by changing the time for energizing the heating elements.

What we claim is:

1. A color printing apparatus comprising:
a reading section for scanning a document to produce a plurality of image signals corresponding to a plurality of fundamental colors in a document pattern of the document;
a coloring medium having a substrate sheet and a repeating pattern of a plurality of color ink layers which are formed on the substrate sheet and correspond to the fundamental colors;
a printing section including thermal head means coupled with the reading section, and a drum for holding a paper on its circumference, said drum rotating for a number of times corresponding to the number of fundamental colors for each color print;
said thermal head means being driven in accordance with the color image signals to thermally transfer one of said plurality of color ink layers to the paper during each rotation of said drum to form a color pattern corresponding to the document pattern on the paper.

2. A color printing apparatus according to claim 1, wherein said reading section includes means for emitting a plurality of fundamental color lights toward said document, and photosensor means for sequentially converting reflecting lights from said document into image signals.

3. A color printing apparatus according to claim 2, wherein said light emitting means includes a plurality of arrays each containing a plurality of light emission elements, said arrays being arranged in a width direction of said document, and said photosensor means includes a plurality of arrays each containing a plurality of photosensor elements of which the number is equal to that of active ones of said light emitting elements.

4. A color printing apparatus according to claim 1, wherein said reading section includes means for illuminating said document, means for splitting the reflecting light rays from said document into a plurality of fundamental color lights, and means for converting the plurality of fundamental color lights into image signals.

5. A color printing apparatus according to claim 4, wherein said color splitting means includes band-pass optical filters allowing only the fundamental color lights to pass therethrough, and said converting means includes CCD image sensors for converting the lights passed through said band pass optical filters into image signals corresponding to the document pattern components of the fundamental colors.

6. A color printing apparatus according to claim 5, wherein said reading section includes pattern memory means for storing said image signals, means for sequentially selecting said image signals of said pattern memory means, and means for converting said image signal selected by said select means into a complementary color image signal corresponding to a complementary color of the fundamental color corresponding to said selected image signal and for supplying the complementary color image signal to said printing section.

7. A color printing apparatus according claim 5, wherein said reading section includes pattern memory means for storing said color image signals for every fundamental color pattern component, and means for converting said color image signal from said pattern memory means into a complementary image signal corresponding to a complementary color different from that of a color corresponding to said color image signal derived from said pattern memory means and for supplying the converted complementary image signal to said printing section.

8. A color printing apparatus according to claim 6, further comprising means for selectively setting up a monochrome mode and a color mode, and wherein said select means in said reading section responds to a mode selection signal to send a monochrome image signal or a color signal to said complementary converting means.

9. A color printing apparatus according to claim 1, wherein said thermal head means includes a heating section made of a number of heating elements arranged in a line and made to intimately contact said coloring medium and means for driving said heating elements according to said image signals.

10. A color printing apparatus according to claim 9, wherein said drive means includes means for changing a calorific value according to a depth of color of said document pattern.

11. A color printing apparatus according to claim 1, wherein said coloring medium is an ink ribbon with ribbon sheet and color ink layers of different amounts and/or different viscosities on said ribbon sheet.

12. A color printing apparatus according to claim 1, further comprising a drum for winding said paper and transferring said paper, and means for separating said thermal head means from said drum when the coloring materials to be transferred to said paper on said drum are changed.

* * * * *